US011999521B2

(12) United States Patent
Scarabelli

(10) Patent No.: US 11,999,521 B2
(45) Date of Patent: Jun. 4, 2024

(54) METHOD FOR PRODUCING PACKAGES AND A SYSTEM THEREOF

(71) Applicant: Tetra Laval Holdings & Finance S.A., Pully (CH)

(72) Inventor: Paolo Scarabelli, Reggio Emilia (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 227 days.

(21) Appl. No.: 17/415,310

(22) PCT Filed: Dec. 16, 2019

(86) PCT No.: PCT/EP2019/085308
§ 371 (c)(1),
(2) Date: Jun. 17, 2021

(87) PCT Pub. No.: WO2020/127019
PCT Pub. Date: Jun. 25, 2020

(65) Prior Publication Data
US 2022/0063856 A1 Mar. 3, 2022
US 2023/0148459 A9 May 11, 2023

(30) Foreign Application Priority Data

Dec. 21, 2018 (EP) .................................... 18215172

(51) Int. Cl.
*B65B 57/04* (2006.01)
*B65B 41/12* (2006.01)
(Continued)

(52) U.S. Cl.
CPC .............. *B65B 57/04* (2013.01); *B65B 41/12* (2013.01); *B65B 41/16* (2013.01); *B65B 61/02* (2013.01);
(Continued)

(58) Field of Classification Search
CPC .......... B65B 57/04; B65B 41/12; B65B 41/16; B65B 61/02; B65B 61/025; B65B 61/26; B65D 41/18
See application file for complete search history.

(56) References Cited

U.S. PATENT DOCUMENTS 5,704,190 A  1/1998  Kaneko et al.
6,739,110 B2 * 5/2004 Ogden ................. B65B 61/025
53/399
(Continued)

FOREIGN PATENT DOCUMENTS

CN   1209770 A    3/1999
EP   1 266 830    12/2002
(Continued)

OTHER PUBLICATIONS

International Search Report & Written Opinion issued in PCT/EP2019/085308 dated Mar. 19, 2020.

*Primary Examiner* — Anna K Kinsaul
*Assistant Examiner* — Himchan Song
(74) *Attorney, Agent, or Firm* — Knobbe, Martens, Olson & Bear, LLP

(57) ABSTRACT

A method for producing packages holding liquid food products from a web of packaging material, wherein the web comprises a number of blanks placed after one another, wherein each blank corresponds to one package, the method comprising receiving a reel holding the web of packaging material, capturing reel data from a tag attached to the reel, transferring the reel data to a printing information database, receiving printing information data (PID) related to the reel data from the printing information database, printing decors on each of the blanks of the web of packaging material based on information provided via the PID, transferring the reel data to a packaging machine information database receiving packaging machine information data (PMID) related to the (Continued)

reel data from the packaging machine information database, and forming the packages from the décor provided web in a packaging machine based on information provided via the PMID.

19 Claims, 4 Drawing Sheets

(51) Int. Cl.
*B65B 41/16* (2006.01)
*B65B 61/02* (2006.01)
*B65B 61/26* (2006.01)
*B65D 41/18* (2006.01)

(52) U.S. Cl.
CPC ............ *B65B 61/025* (2013.01); *B65B 61/26* (2013.01); *B65D 41/18* (2013.01)

(56) References Cited

U.S. PATENT DOCUMENTS

| | | | |
|---|---|---|---|
| 6,769,228 B1 * | 8/2004 | Mahar | G06Q 10/08 |
| | | | 53/238 |
| 2005/0252175 A1 * | 11/2005 | Martin | B65B 61/025 |
| | | | 53/64 |
| 2006/0087113 A1 | 4/2006 | Snyder et al. | |
| 2006/0259182 A1 * | 11/2006 | Mantell | G06Q 10/08 |
| | | | 700/213 |
| 2014/0035986 A1 * | 2/2014 | Adachi | B41J 3/60 |
| | | | 283/74 |
| 2018/0057199 A1 * | 3/2018 | Aiello | B65B 55/04 |
| 2018/0282010 A1 * | 10/2018 | Barlow, Jr. | B65H 23/192 |
| 2019/0112089 A1 * | 4/2019 | Fioravanti | B65B 9/20 |
| 2021/0323319 A1 * | 10/2021 | Olsson | B41J 15/04 |

FOREIGN PATENT DOCUMENTS

| | | |
|---|---|---|
| EP | 1 914 168 | 4/2008 |
| GB | 2 086 309 | 5/1982 |
| WO | WO 2004/045953 | 6/2004 |
| WO | WO 2016/207125 | 12/2016 |

\* cited by examiner

METHOD FOR PRODUCING PACKAGES AND A SYSTEM THEREOF

TECHNICAL FIELD

The invention generally relates to the field of packaging technology, such as food packaging technology. More particularly, it is presented methods and apparatuses for producing packages holding liquid food products.

BACKGROUND ART

Today it is commonly known to use roll-fed packaging machines for different types of food products, e.g. milk. The roll-fed packaging machines, also referred to as filling machines, have several advantages. One is that a continuous production of packages makes it possible to achieve higher speeds compared to blanks-fed packaging systems. Another advantage is that by continuously filling a tube of packaging material and forming packages in a lower end of the tube, a risk that unwanted microorganisms enter the packages can be lowered.

The packaging material is today most often printed using so-called flexography in packaging material production centers, sometimes also referred to as converting factories, for carton-based packaging material. After being printed and in other ways prepared for holding food products, for example being laminated such that an inner plastic layer is formed between a carton layer of the packaging material and the food product, the packaging material is loaded onto a reel and shipped to a site where a packaging machine is placed.

To provide further possibilities to customize the packages it has been suggested to use so-called on site printing for printing the packages. More particularly, a digital printing module can be placed at a dairy or other facility for packaging food products such that the packaging material can be printed at the same location as the packaging machine is located. Having printing capabilities in this way provides for flexibility. A décor of the packages can namely be decided at a later point of time.

Even though it is known to use digital printing for printing the packaging material, there is a number of challenges that needs to be overcome. One of these challenges is how to reliably provide the on-site printing module with data linked to the packaging material such that it can be assured that correct printing is achieved.

SUMMARY

It is an objective of the invention to at least partly overcome one or more of the above-identified limitations of the prior art. In particular, it is an object to provide a method and a system providing increased flexibility in terms customization possibilities of packages, reducing a risk of misalignments of pre-printed and on-site printed sections on the packages as well as linking a printing module and a packaging machine more close to each other such that a more efficient on-site printing can be achieved.

According to a first aspect it is provided a method for producing packages holding liquid food products from a web of packaging material, wherein the web comprises a number of blanks placed after one another, wherein each blank corresponds to one package, the method comprising receiving a reel holding the web of packaging material, capturing reel data from a tag attached to the reel, transferring the reel data to a printing information database, receiving printing information data (PID) related to the reel data from the printing information database, printing decors on each of the blanks of the web of packaging material based on information provided via the PID such that a décor provided web is formed, transferring the reel data to a packaging machine information database, receiving packaging machine information data (PMID) related to the reel data from the packaging machine information database, and forming the packages from the décor provided web in a packaging machine based on information provided via the PMID.

The web of packaging material held on the reel may comprise pre-printed sub-sections and on-site printed sub-sections, wherein the PID may comprise décor data for the on-site-printed sub-sections of the web of packaging material.

The PID may further comprise on-site printing position information for the on-site printed sub-sections, wherein the on-site printing position information is using a reference object in the décor provided web as a reference position.

The reference object may be a graphical object in the pre-printed sections.

The reference object may be a reference element integrated in the web of packaging material.

The web of packaging material may comprise weakening lines for facilitating folding of the décor provided web of packaging material into the packages, wherein the weakening lines may be positioned based on the reference position of the reference object.

The on-site printed sections may comprise caps attached to the web of packaging material.

The décors printed on each of the blanks may be individual for each blank.

The printing information database and the packaging machine information database may be two separate databases with different access restrictions.

The reel data may comprise at least packaging material information and liquid food product information.

The PID may comprise settings information for a pre-treatment device, one or several printer bars and/or one or several curing devices in a printing module, and the PMID may comprise settings information for a sterilization device, a sealing device and/or a folding device in the packaging machine.

Décor data corresponding to the decors printed on the web of packaging material may be part of the reel data.

According to a second aspect it is provided a system for producing packages holding liquid food products from a web of packaging material, wherein the web comprises a number of blanks placed after one another, wherein each blank corresponds to one package, wherein the system comprises a reel holder arranged to receive a reel holding the web of packaging material, a tag reader configured to capture reel data from a tag attached to the reel, a data communication module configured to transfer the reel data to a printing information database, and receive printing information data (PID) related to the reel data from the printing information database, a printing module arranged to print decors on each of the blanks of the web of packaging material based on information provided via the PID such that a décor provided web is formed, the data communication module configured to transfer the reel data to a packaging machine information database and receive packaging machine information data (PMID) related to the reel data from the packaging machine information database, a packaging machine arranged to form the packages from the décor provided web based on information provided via the PMID.

The features described above with reference to the first aspect are also applicable to the second aspect.

According to a third aspect it is provided a reel of packaging material comprising a web of packaging material, and a tag attached to the reel, wherein the tag comprises reel data, wherein the reel data can be used by a system according to the second aspect such that decors can be printed on the web and such that packages can be formed from the web.

According to a fourth aspect it is provided a computer program product comprising instructions which, when executed on a computer, cause the computer to carry out the method according to the first aspect.

Still other objectives, features, aspects and advantages will appear from the following detailed description as well as from the drawings.

BRIEF DESCRIPTION OF THE DRAWINGS

Embodiments will now be described, by way of example, with reference to the accompanying schematic drawings, in which.

DETAILED DESCRIPTION

Figure 1:
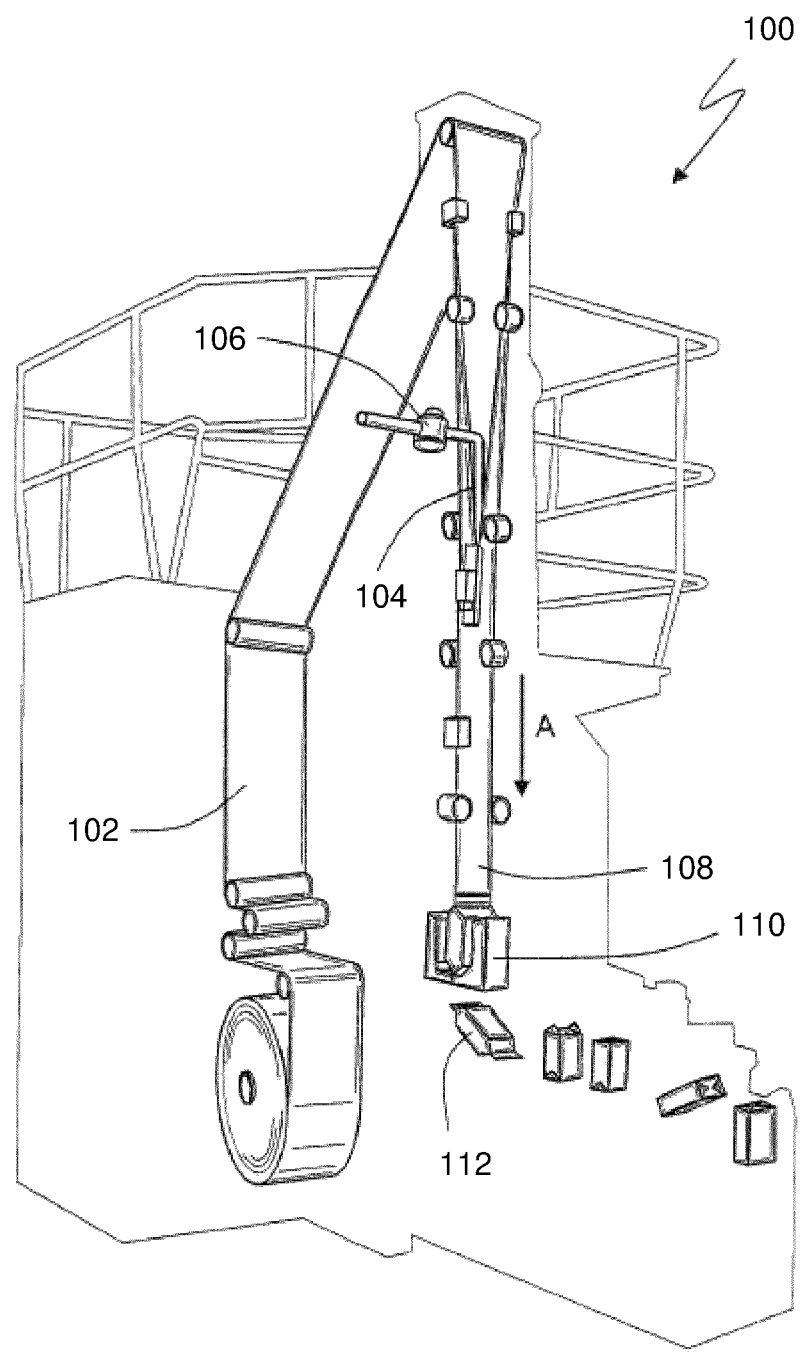
FIG. 1 is a general illustration of a roll-fed packaging machine.

With reference to FIG. 1, a packaging machine 100, sometimes also referred to as a filling machine, is generally illustrated by way of example. The packaging machine 100 is a roll-fed packaging machine used for packaging liquid food products in carton-based packages. Already in the 1940s this type of packaging machines was introduced by Tetra Pak, and it is today a well-known approach for packaging milk and other liquid food products in a safe and cost-efficient manner. The general approach can also be used for non-liquid food products, such as potato crisps.

Today, packaging material is often printed and prepared in packaging material production centers, also referred to as converting factories, and is shipped to a site where the packaging machine 100 is placed, e.g. a dairy. Usually the packaging material is loaded onto a reel before being transported. After arriving at the site, the reel is placed in the packaging machine as illustrated in FIG. 1.

During production a web 102 of packaging material can be fed from the reel through the packaging machine in a web feeding direction A. Even though not illustrated in FIG. 1, the packaging material may pass through a sterilization device, e.g. a hydrogen peroxide bath or an LVEB (Low-Voltage Electron Beam) station, for ensuring that the web 102 is free from unwanted microorganisms. Before providing the food product, a tube can be formed from the web 102 by forming a longitudinal sealing. The food product can be fed into the tube via a pipe 104 and a valve 106 may be used for regulating a flow through the pipe 104. A lower end 108 of the tube can be fed into a folding device 110 in which a transversal sealing is made, the tube is folded according to folding lines, also referred to as weakening lines, and cut off such that packages 112 can be formed. Even though the folding device 110 is illustrated as one single device, the folding device 110 may comprise a number of different devices.

Figure 2:
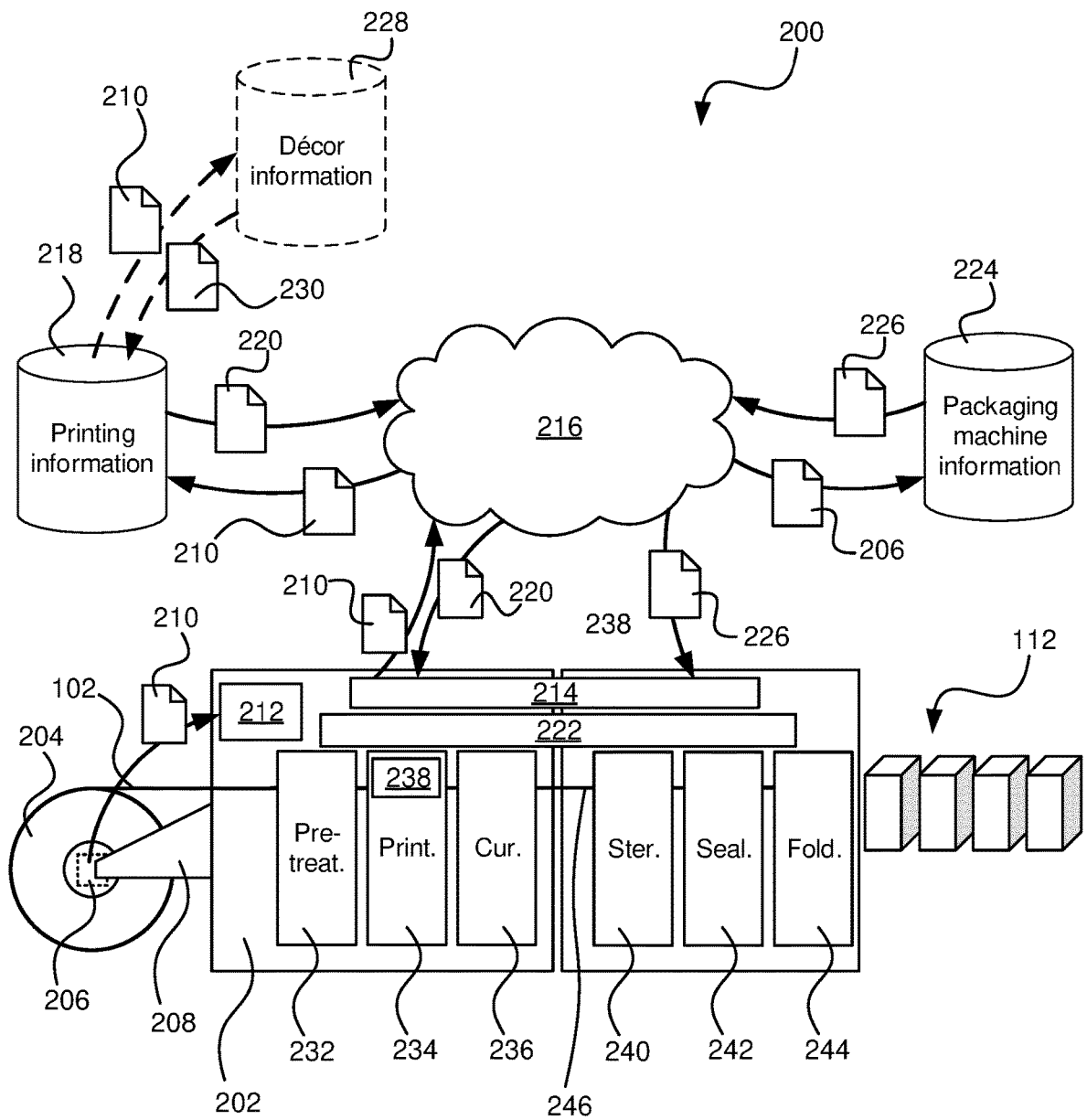
FIG. 2 is a general illustration of a system comprising a printing module and a packaging machine.

FIG. 2 generally illustrates a system 200 comprising a printing module 202 and the packaging machine 100. As illustrated in FIG. 2, the printing module 202 can be placed upstream the packaging machine 100. An advantage with having the printing module 202 placed in this way is that the packaging material can be printed on-site in part or in full, that is, printing and packaging can be performed at the same site. Another advantage can be that no or minor modifications of the packaging machine 100 are required. As an alternative, instead of having the printing module 202 placed as a separate apparatus upstream the packaging machine 100, the printing module 202 may be an integral part of the packaging machine 100, though not illustrated.

A reel 204 holding the web 102 of packaging material can be provided to the printing module 202 as illustrated in FIG. 2. The reel 204 may be provided with a tag 206, such as an RFID tag, and the reel 204 may be held in place by a reel holder 208. The tag 206 can comprise reel data 210. The reel data 210 may be used for providing information about settings of the printing module 202 as well as the packaging machine 100, but also information about decors to be printed on the web 102 loaded on the reel 204.

The reel data 210 may be read from the tag 204 by a tag reader 212 provided in the printing module 202. After being read from the tag 204, the reel data 210 may be transferred from the tag reader 212 to a data communications module 214, which in turn can transfer the reel data to a cloud computer 216, which in this context may be referred to as a recipe line management tool.

From the cloud computer 216, the reel data 210 can be transferred to a printing information database 218. In the printing database 218, decors for different webs may be stored, but also printer module settings for different types of packaging materials as well as different types of products to be packaged. The reel data 210 can comprise information about the packaging material, information about the product to be packaged and an identification of the web. Based on the reel data 210, packaging information data (PID) 220 can be determined and returned to the cloud computer 216. The cloud computer 216 may in turn transfer the PID 220 to the data communications module 214, which in turn provide for that the PID 220 is handed to a controller 222, which in this context may be referred to as a recipe and printer controller.

The reel data 210 may also be transferred to a packaging machine information database 224. In the packaging machine information database 224, based on the reel data 210, packaging machine information data (PMID) 226 can be determined. The PMID 226 can comprise packaging machine settings for different types of packaging materials as well as different types of products to be packaged. After the PMID 226 has been determined based on the reel data 210, the PMID 226 can be returned to the cloud computer 216, and from the cloud computer 216 transferred to the data communications module 214 and from there to the controller 222.

An advantage of having to the printing information database 218 and the packaging machine information database 224 separated is that different access restrictions may be given for the two databases.

Since the printing information database 218 comprises both information about the decors to be printed on the web of packaging material and information about the printer settings, it can be advantageous to have a décor database 228 that is separated from the printing information database 218. By having this separated, package designers can get access to the décor database 228 such that new décor designs may be uploaded easily. The décor database 228 can communicate with the printing information database 218. For instance, in that the reel data 210 can be transferred from the printing information database 218 to the décor database 228 and that in return décor data 230 can be transferred from the décor database 228 to the printing information database 218. In the printing information database 218, the décor data 230 may then by incorporated into the PID 220 related to the reel data 210.

As illustrated in FIG. 2, the data communications module 214 may be shared between the printing module 202 and the packaging machine 100. Another option is to have separate data communications modules in the printing module 202 and the packaging machine 100. Similarly, the controller 222 may, instead of being shared between the printing module 202 and the packaging machine 100, comprise a number of different devices that may be placed in both the printing module 202 and the packaging machine 100. Further, even though it is an advantage to have the printing module 202 separated from the packaging machine 100 since this provides for that the packaging machine 100 may be upgraded with on-site printing capability, it is also possible to have the printing module 202 integrated with the packaging machine 100 such that the two form one and the same piece of equipment.

In addition to providing information about the décor to be printed on the web 102, the PID 220 may be used for adjusting settings of the printing module 202. The settings may comprise settings for a pre-treatment device 232, printer bars 234 and curing devices 236.

Figure 3:
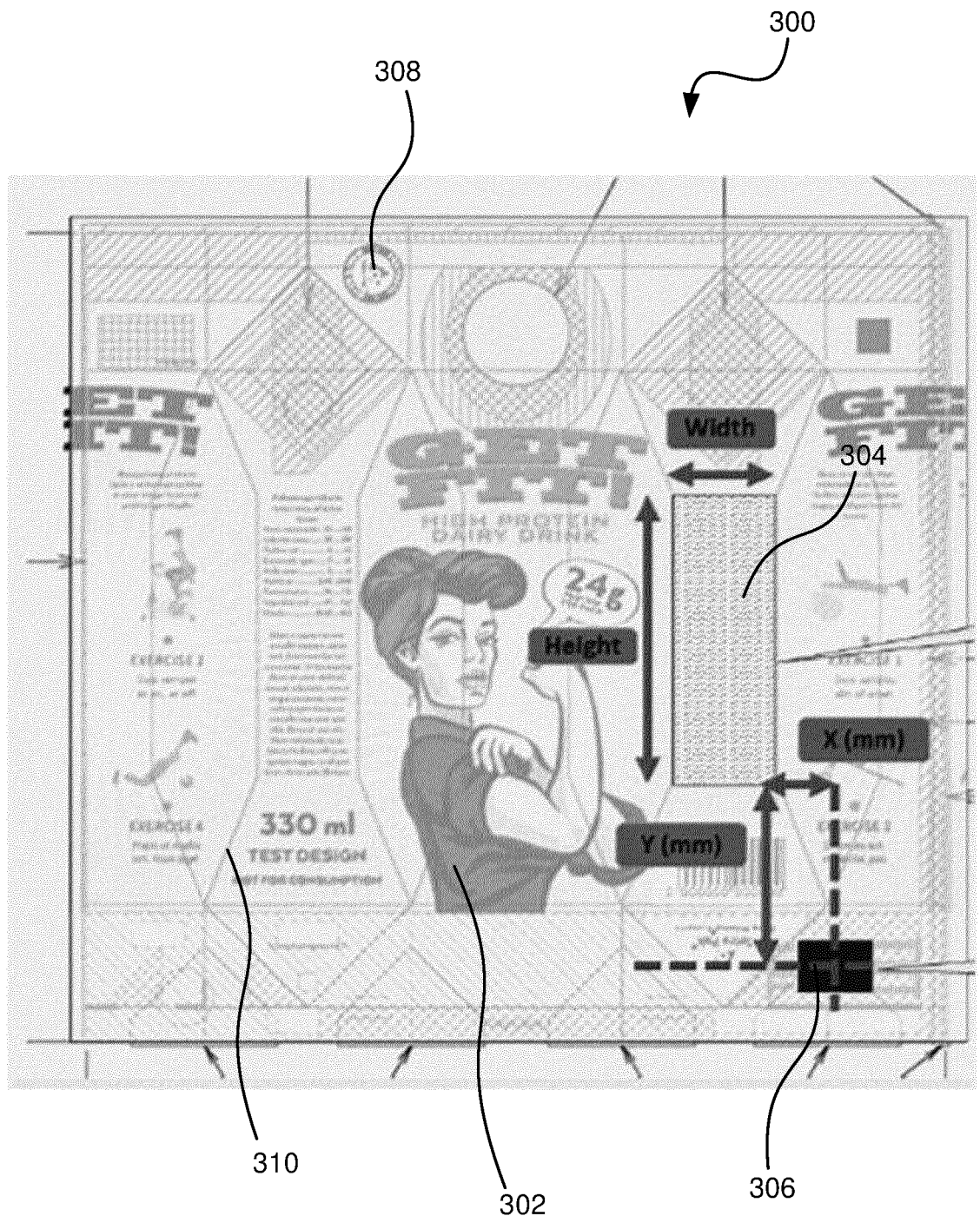
FIG. 3 is an example of a blank of packaging material, which may form part of the web.

The web 102 may comprise pre-printed sections and on-site printed sections, i.e. sections to be printed in the printing module 202, as is further illustrated in FIG. 3. In the pre-printed sections there may be provided a reference object. The reference object may be a graphical object, such as a barcode or a QR code, but also a water mark, i.e. a mark not visible to a human eye in daylight conditions. A position of the reference mark, referred to as a reference position, may be used for adjusting the printer module 202 such that on-site printed sections are accurately printed in terms of position. Still an option is that the reference object is integrated in the web 102 of packaging material. For instance, the reference mark may be a reference element, such as a magnetic particle, placed inside the packaging material.

The web 102 of packaging material can be provided with weakening lines, also referred to as folding lines. A main reason for having the weakening lines is that folding of the web 102 of packaging material into the packages can be made in a more reliable way. This in turn provides for that less packages need to be discarded due to non-conformance with quality requirements, that the packaging machines can be run at higher speeds as well as that packages with distinct edges and corners can be achieved. To provide for that the weakening lines and the on-site printed sections are aligned, the weakening lines may be provided based on the reference position of the reference object. Having both the weakening lines and the on-site printed sections placed with respect to the reference position provided by the reference object can namely provide for that in addition to that the on-site printed sections are accurately placed with respect to the pre-printed sections, that the on-site printed sections are also accurately placed with respect to the weakening lines. By doing so, by way of example, a risk can be reduced that a front panel décor intended to be placed on a front panel solely is misaligned with respect to the weakening lines such that part of the front panel décor is provided on a side panel.

To identify the reference object, a sensor 238 may be used. In case the reference object is the graphical object, the sensor 238 may a vision sensor. Instead, if the reference object is the magnetic particle embedded in the web 102, the sensor 238 may be a magnetic sensor. After the sensor 238 has identified the reference object, the reference position can be determined, i.e. the position of the reference object. Based on the reference position and the PID, which may comprise how the on-site printed sections are placed in relation to the reference position, the on-site printed sections may be printed on the web 102.

The PMID 226 provided to the packaging machine 100 may be used for setting a sterilization device 240, a sealing device 242 and a folding device 244. In this manner, these devices may be adjusted in line with the packaging material being used, but also adapted to the printing being made in the printing module 202. For instance, the sterilization device 240 may be adapted based on how the web 102 was cured in the printing module 202. The reference object may also be used in the packaging machine 100. For instance, the reference object may be used when sealing the web into the packages. Both when forming the tube by providing a longitudinal sealing as well as when forming the packages 112 from the tube by providing transversal sealings.

Thus, after the reel 204 has been received both the printing module 202 and the packaging machine 100 can be adjusted to the web 102 provided on the reel 204, both when the web 102 is transformed into a décor provided web 246 in the printing module 202 as well as when the décor provided web 246 is transformed into the packages 112 in the packaging machine 100.

FIG. 3 illustrates an example of a blank 300 of packaging material that can be formed into one of the packages 112. In this particular example, the pre-printed sections 302, which is off site printed, covers a main portion of the blank 300, and a minor portion of the piece is the on-site printed sections 304, which is printed in the printing module 202, i.e. on site. The reference object 306 can be provided, and as illustrated a position of the on-site printed sections 304 can be determined based the reference position, i.e. the position of the reference object 306. The position of the on-site printed sections 304 can be determined with respect to the reference position as a first distance with respect to a first direction, herein denoted X, and a second distance with respect to a second direction, herein denoted Y. This information, as well as a height and a width of the on-site printed sections 304, may be provided to the printing module 202 via the PID 220. Alternatively, the information may be provided directly from the reel data 210.

An additional reference object 308 may be provided as well. In this example, the additional graphical object 308 is a graphical object. By having two reference objects, the reference object 306 and the additional reference object 308, the position of the on-site printed sections 304 may be determined more accurately. In case the reference object 306 is a reference object embedded in the web and the additional reference object 308 is the graphical object, it is also possible for the printing module 202 to make a quality assessment of the pre-printed sections 302, i.e. assuring that that pre-printed sections 302 has been placed correctly in the packaging material production centers.

The weakening lines 310 may be provided in the blank 300. The weakening lines 310, also referred to as folding lines, can be provided in the packaging material production center before or after the pre-printed sections 304 are printed.

Even if only one pre-printed section 302 and only one on-site printed section 304 is illustrated, it is to be understood that this is merely an example and that any number of pre-printed sections 302 and on-site printed sections 304 are possible, and also that non-printed sections may be present.

Even though not illustrated, the blank 300 may comprise a cap, which in this context should be understood as any type of opening device. The cap may form part of the on-site printed sections 304.

Figure 4:
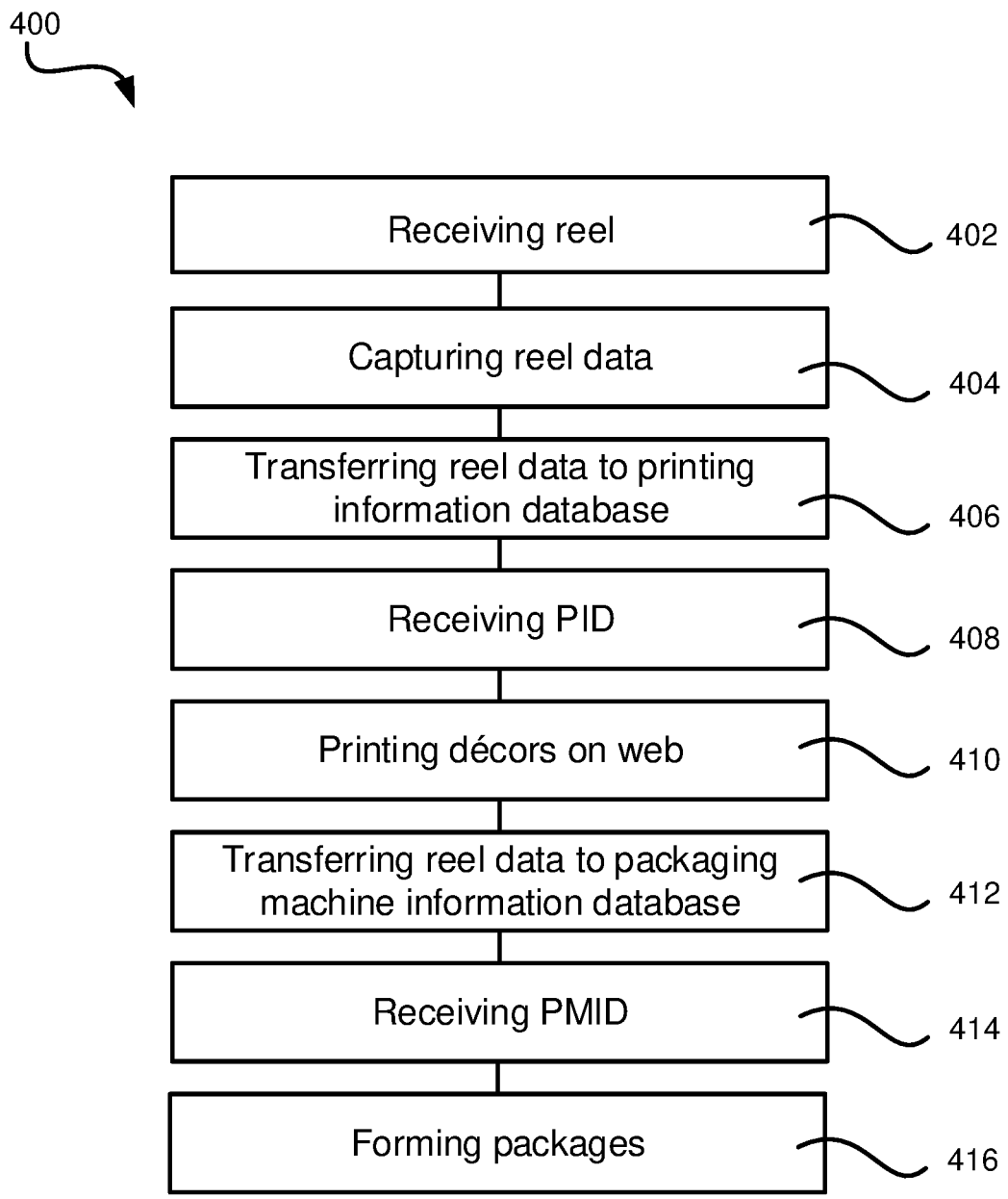
FIG. 4 is a flow chart illustrating a method for printing the web.

FIG. 4 is a flowchart 400 illustrating a method for printing the web 102. In a first step 402 the reel 204 can be received. In a second step 404 the reel data 210 can be captured. Next, in a third step 406, the reel data 210 can be transferred to the printing information database 218. In a fourth step 408, the PID 200 can be received from the printing information database 218. In a fifth step 410, the decors may be printed on the blanks of the web. In a sixth step 412, the reel data 210 may be transferred to the packaging machine information database 224. In return, in a seventh step 414, the PMID 226 may be received. In an eighth step 416, the packages 112 may be formed based on information provided via the PMID 226.

Even though presented in a particular order it is to be understood that the steps may be performed in different orders as well.

From the description above follows that, although various embodiments of the invention have been described and shown, the invention is not restricted thereto, but may also be embodied in other ways within the scope of the subject matter defined in the following claims.

The invention claimed is:

1. A method for producing packages holding liquid food products from a web of packaging material, wherein the web comprises a number of blanks placed after one another, wherein each blank corresponds to one package, the method comprising:
receiving one or more reels holding the web of packaging material,
capturing reel data from a tag attached to the one or more reels,
transferring the reel data to a printing information database,
receiving printing information data (PID) related to the reel data from the printing information database,
printing décors on each of the blanks of the web of packaging material based on information provided via the PID such that a décor provided web is formed,
transferring the reel data to a packaging machine information database,
receiving packaging machine information data (PMID) related to the reel data from the packaging machine information database, and
forming the packages from the décor provided web in a packaging machine based on information provided via the PMID,
wherein the web of packaging material held on the one or more reels comprises pre-printed sub-sections and on-site printed sub-sections, and
wherein the PID comprises décor data for the on-site printed sub-sections of the web of packaging material.

2. The method according to claim 1, wherein the PID further comprises on-site printing position information for the on-site printed sub-sections, and wherein the on-site printing position information is using a reference object in the décor provided web as a reference position.

3. The method according to claim 2, wherein the reference object is a graphical object in the pre-printed sub-sections.

4. The method according to claim 2, wherein the reference object is a reference element integrated in the web of packaging material.

5. The method according to claim 2, wherein the web of packaging material comprises weakening lines for facilitating folding of the décor provided web of packaging material into the packages, and wherein the weakening lines are positioned based on the reference position of the reference object.

6. The method according to claim 1, wherein the on-site printed sub-sections comprise caps attached to the web of packaging material.

7. The method according to claim 1, wherein the decors printed on each of the blanks are individual for each blank.

8. The method according to claim 1, wherein the printing information database and the packaging machine information database are two separate databases with different access restrictions.

9. The method according to claim 1, wherein the reel data comprises at least packaging material information and liquid food product information.

10. The method according to claim 1, wherein the PID further comprises at least one of settings information for a pre-treatment device, one or several printer bars, or one or several curing devices in a printing module, and wherein the PMID comprises at least one of settings information for a sterilization device, a sealing device, or a folding device in the packaging machine.

11. The method according to claim 1, wherein décor data corresponding to the decors printed on the web of packaging material is part of the reel data.

12. A non-transitory computer readable medium storing instructions which, when executed on a computer, cause the computer to carry out the method according to claim 1.

13. A system for producing packages holding liquid food products from a web of packaging material, wherein the system comprises:
a reel holder arranged to receive a reel holding the web of packaging material, wherein the web of packaging material comprises a number of blanks placed after one another, wherein each blank corresponds to one package,
a tag reader configured to capture reel data from a tag attached to the reel,
a data communication module configured to transfer the reel data to a printing information database, and receive printing information data (PID) related to the reel data from the printing information database,
a printing module arranged to print decors on each of the blanks of the web of packaging material based on information provided via the PID such that a décor provided web is formed,
wherein the data communication module is further configured to transfer the reel data to a packaging machine information database and receive packaging machine information data (PMID) related to the reel data from the packaging machine information database, and
a packaging machine arranged to form the packages from the décor provided web based on information provided via the PMID,
wherein the web of packaging material comprises pre-printed sub-sections and on-site printed sub-sections, and
wherein the PID comprises décor data for the on-site printed sub-sections of the web of packaging material.

14. A reel of packaging material for use with a system according to claim 13, the reel comprising:
a web of packaging material, and
a tag attached to the reel, wherein the tag comprises reel data,
wherein the reel data can be used by the system according to claim 13 such that decors can be printed on the web and such that packages can be formed from the web.

15. The system according to claim 13, wherein the PID further comprises on-site printing position information for the on-site printed sub-sections, and wherein the on-site printing position information is using a reference object in the décor provided web as a reference position.

16. The system according to claim 15, wherein the reference object is a graphical object in the pre-printed sub-sections or a reference element integrated in the web of packaging material.

17. The system according to claim 13, wherein the printing module is arranged to print individual decors for each blank.

18. The system according to claim 13, wherein the printing information database and the packaging machine information database are two separate databases with different access restrictions.

19. A method for producing packages holding liquid food products from a web of packaging material, wherein the web comprises a number of blanks placed after one another, wherein each blank corresponds to one package, the method comprising:

receiving one or more reels holding the web of packaging material,
capturing reel data from a tag attached to the one or more reels,
transferring the reel data to a printing information database,
receiving printing information data (PID) related to the reel data from the printing information database,
printing décors on each of the blanks of the web of packaging material based on information provided via the PID such that a décor provided web is formed,
transferring the reel data to a packaging machine information database,
receiving packaging machine information data (PMID) related to the reel data from the packaging machine information database, and
forming the packages from the décor provided web in a packaging machine based on information provided via the PMID,
wherein the PID comprises at least one of settings information for a pre-treatment device, one or several printer bars, or one or several curing devices in a printing module, and
wherein the PMID comprises at least one of settings information for a sterilization device, a sealing device, or a folding device in the packaging machine.

* * * * *